United States Patent [19]

Vignes

[11] Patent Number: 4,892,702

[45] Date of Patent: Jan. 9, 1990

[54] LIGHT-WATER NUCLEAR REACTOR VESSEL AND PROCESS FOR ITS MANUFACTURE

[75] Inventor: Alain Vignes, Paris, France

[73] Assignee: Framatome, Courbevoie, France

[21] Appl. No.: 258,358

[22] Filed: Oct. 17, 1988

[30] Foreign Application Priority Data

Oct. 16, 1987 [FR] France ................. 87 14323

[51] Int. Cl.$^4$ ............... G21C 13/08; G21C 21/00
[52] U.S. Cl. ........................... 376/294; 29/906
[58] Field of Search ........... 376/294, 260; 220/3; 29/906, 469, 157 R; 219/121.13, 121.14

[56] References Cited

U.S. PATENT DOCUMENTS

| | | | |
|---|---|---|---|
| 3,456,831 | 7/1969 | Johansson | 220/3 |
| 4,057,163 | 11/1977 | Widart et al. | 376/294 |
| 4,160,150 | 7/1979 | Konig | 219/121.14 |
| 4,576,785 | 3/1986 | Clements et al. | 376/294 |

FOREIGN PATENT DOCUMENTS

2537115  3/1976  Fed. Rep. of Germany .
2390236  12/1978  France .

OTHER PUBLICATIONS

"Development of PWR Pressure Vessel Steels", Druce et al., Nucl. Energy, vol. 19, 10/80, pp. 347–360.
*Technica*, vol. 26, 1985, pp. 105–109, Behnisch.
*Nuclear Engineering*, vol. 12, No. 133, 6/67, pp. 444–448, "Reactor Pressure Vessels Design–Fabrication–Testing", Porse.

*Primary Examiner*—Daniel Wasil
*Attorney, Agent, or Firm*—Pollock, Vande Sande & Priddy

[57] ABSTRACT

A vessel comprising a shell of large thickness, for example between 200 and 300 mm, consists of unit components symmetrical in revolution (2a, 2b, 6, 7, 8, 9, 10, 3a, 3b) and connected together by end-to-end welding. The components are made of a steel containing 2 to 2.50% of chromium, 0.9 to 1.1% of molybdenum and less than 0.15% of carbon. The welding for connecting these unit components is performed by means of an electron beam in a single pass over the entire thickness of the components, without filler metal. the invention applies particularly to the manufacture of a vessel for a pressurized-water nuclear reactor.

6 Claims, 5 Drawing Sheets

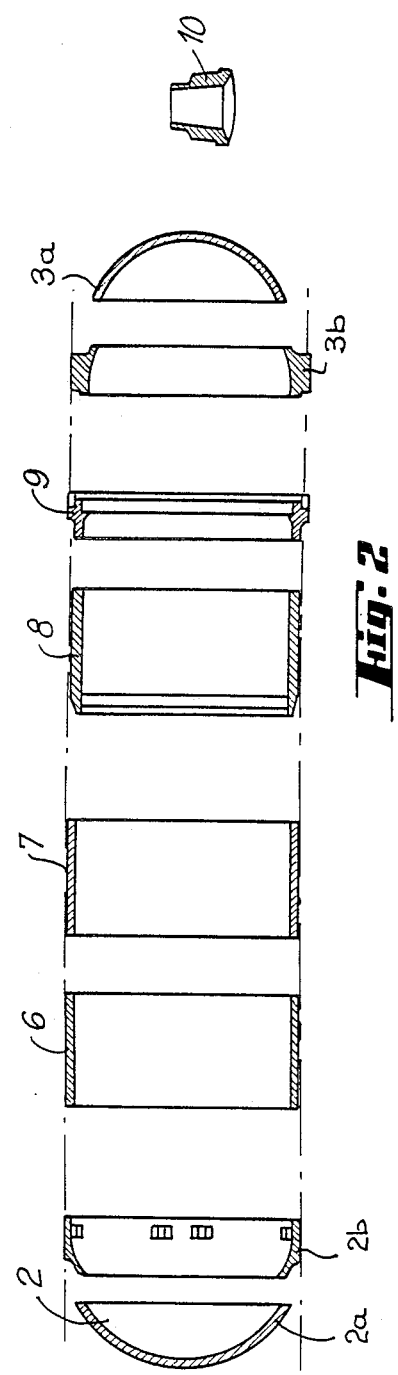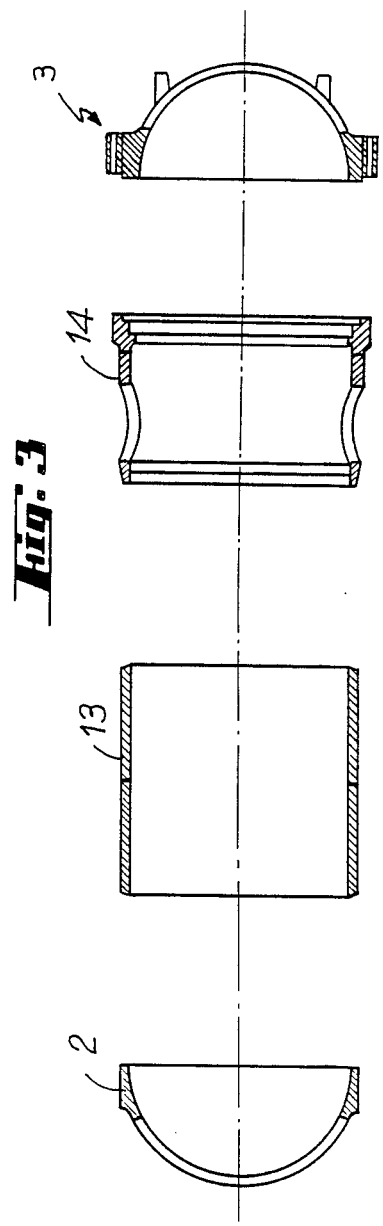

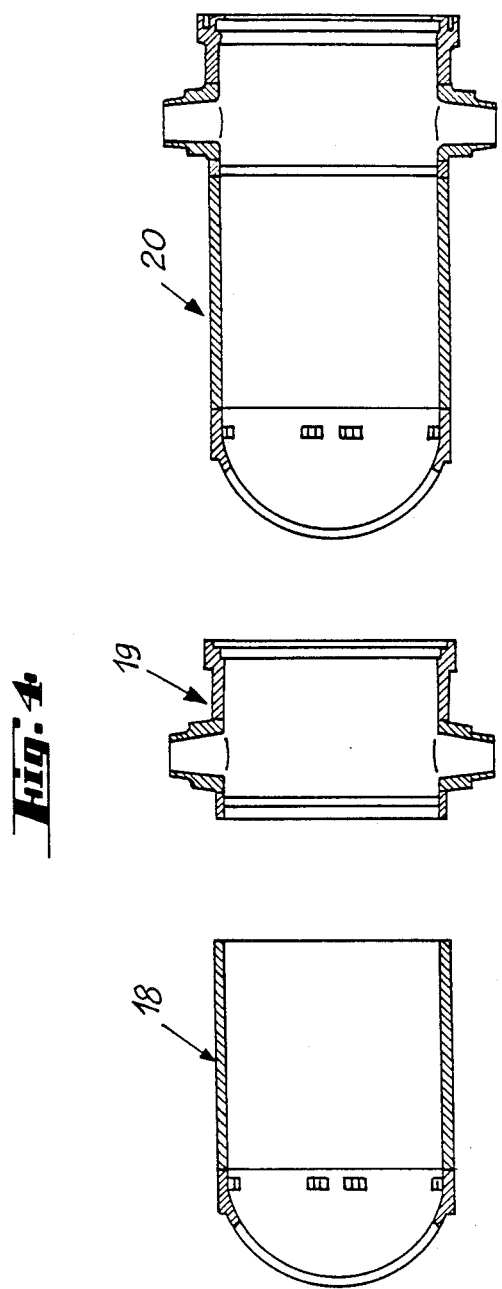

LIGHT-WATER NUCLEAR REACTOR VESSEL AND PROCESS FOR ITS MANUFACTURE

FIELD OF THE INVENTION

The invention relates to a process for the manufacture of a light-water nuclear reactor vessel comprising a shell of great thickness, e.g., greater than 100 mm. In particular, the invention relates to a process for the manufacture of a pressurized-water nuclear reactor vessel and to a vessel of this kind.

BACKGROUND OF THE INVENTION

Pressurized-water nuclear reactor vessels consist of a shell of overall cylindrical shape, closed at its ends by dished bottoms. The vessel containing the core is exposed to intense neutron radiation and needs to withstand the temperature and the pressure of the primary fluid, consisting of water at a temperature in the region of 320° C. and at a pressure of the order of $150 \times 10^5$ Pa. The vessels of pressurized-water nuclear reactors which are at present in use have a thickness which is generally between 200 and 300 mm and must to be constructed from cylindrical shells and from a first dished bottom, these components being assembled by welding. The second dished bottom of the vessel forms the closure head which is fastened by means of studs when the vessel is commissioned, onto a flange which is welded onto one of the shells forming the vessel.

The assembly of the vessel is carried out by submerged arc welding with filler metal, and this operation requires the ends of the components to be assembled to be suitably machined in order to delimit two welding chamfers which are then filled with filler metal.

The weld thus produced must then be remachined on the inside and outside and subjected to a heat treatment.

Despite all the precautions taken during the welding operations, the filler metal introduces a certain discontinuity into the metallurgical structure of the vessel metal, and this may be awkward, especially if a welded joint is situated in a region of the vessel opposite the core.

However, it has been possible to obtain a very high degree of safety of the vessels by taking very great precautions during the welding operations and by carrying out many inspections.

The assembly of a nuclear reactor vessel is therefore a very lengthy operation, which requires the use of complex means and the presence of highly qualified personnel. The execution of the filling of the weld chamfers requires many welding passes and the metal which is deposited must to be monitored in order to prevent the presence of any foreign particle in the welded joint (slag inclusions, etc.).

There are known assembly processes using welding without filler metal, which permit a welded joint to be produced in a single pass and over a relatively great thickness.

In particular, welding by means of an electron beam has already been employed for assembling components of relatively great thicknesses.

However, tests have shown that the steels which are currently employed for the construction of light-water nuclear reactor vessels do not permit the welding of components of a thickness greater than 100 mm by means of an electron beam and in a single pass, with a perfect quality of the welded joint.

SUMMARY OF THE INVENTION

The object of the invention is therefore to provide a process for the manufacture of a light-water nuclear reactor vessel comprising a shell of great thickness, e.g. greater than 100 mm, symmetrical in revolution, consisting in shaping at least two unit components of overall symmetrical shape in revolution and generally annular, and in then assembling them by welding over their entire thickness to produce the vessel, this process permitting the production of welded joints of very high quality and the manufacture of components possessing very good radiation resistance, with a time of execution which is much shorter than in the prior art.

To this end, the unit components, whose wall thickness is greater than 100 mm, are made of a steel containing 2 to 2.5% of chromium, 0.9 to 1.1% of molybdenum and less than 0.15% of carbon, and the assembly of the unit components is carried out by welding by means of an electron beam, in a single pass, without filler metal, over the entire thickness of the components.

BRIEF DESCRIPTION OF THE DRAWINGS

In order that the invention may be more clearly understood, the process of manufacture according to the invention as applied to a pressurized-water nuclear reactor vessel of a diameter of the order of 4.50 m, and the vessel produced using the process according to the invention, will now be described by way of example with reference to the attached drawings.

FIGS. 2, 3 and 4 are exploded views showing the various unit components forming a vessel and the way they are assembled.

DESCRIPTION OF PREFERRED EMBODIMENT

Figure 1:
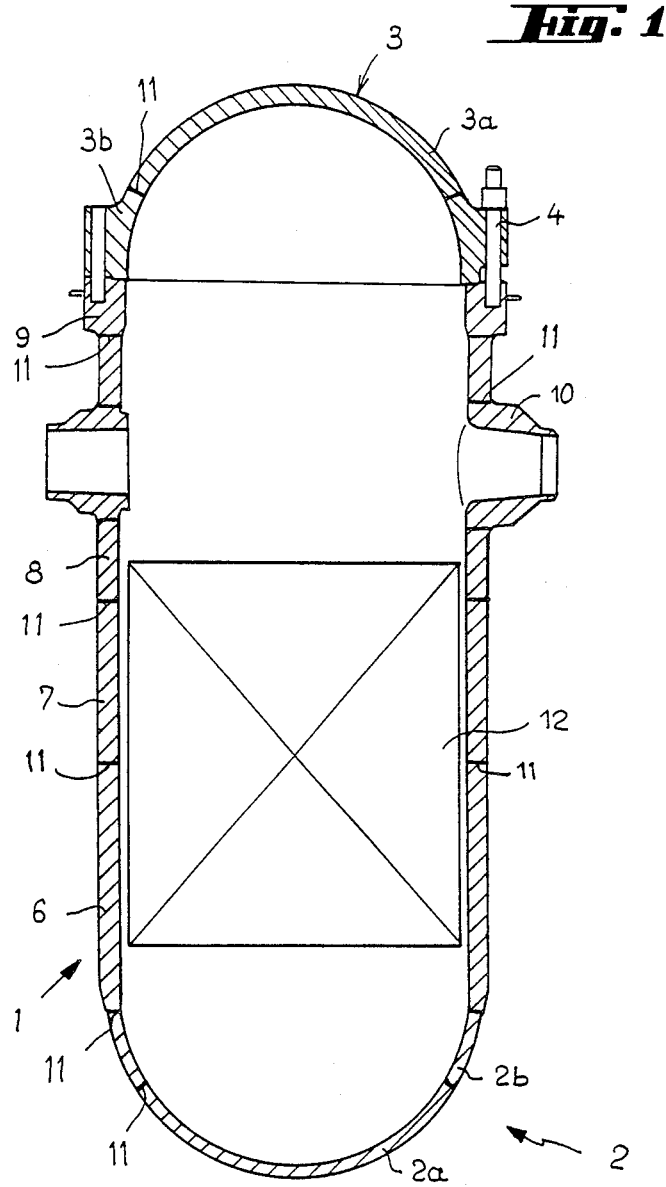
FIG. 1 is a view in axial section of a vessel of a pressurized-water nuclear reactor.

FIG. 1 shows a vessel 1, comprising a middle section of cylindrical shape, together with a dished bottom 2 and a closure head 3 of hemispherical shape. The closure head 3 is fastened onto the body of the vessel 1 by means of studs 4.

The cylindrical section of the vessel consists of two core shells 6 and 7, a pipe-carrying shell 8 and a flange 9. The pipes 10 permit the vessel to be connected to the piping of the primary circuit. The bottom 2 and the closure head 3 consist of two parts 2a, 2b and 3a, 3b, respectively.

The unit components 2a, 2b, 6, 7, 8, 9 and 10 forming the vessel body are assembled together by welding at the joints 11. Similarly, the parts 3 and 3b of the closure head are assembled by welding.

The region 12 in which the fuel assemblies forming the core of the reactor are arranged inside the vessel 1 is shown.

It can be seen that the weld joints 11 between the two core shells 6 and 7, on the one hand, and between the upper core shell 7 and the pipe-carrying shell 8, which are level with the core, are those most stressed by the irradiation.

FIG. 2 shows the various unit components forming the reactor vessel, before they are assembled. Most of these components form shells or flanges of annular shape, with the exception of the two spherical end caps 2a and 3a.

These components are made by forging a steel whose composition is as follows:

C: 0.22%, Mn: 1.15 to 1.60%, Si: 0.10 to 0.30%, Ni: 0.50 to 0.80%, Cr: 0.25%, Mo: 0.43 to 0.57%.

The various components to be assembled are then machined so as to produce edges at their ends which fit so as to coincide. When the components are placed in the assembly position, the edges delimit one or two chamfers in which filler metal is deposited by successive passes of automatic submerged arc welding.

The edges and a part of the filler metal are then machined and the welded joint is then finished by depositing successive layers which themselves consist of successive welding passes. Very many passes must be performed in order to produce a welded joint.

As can be seen in FIG. 3, in a first step, the core shells 6 and 7 are assembled end to end into the shape of a shell 13. The bottom 2 is assembled and is then welded onto the assembly produced. This first assembly 18 forms the lower subassembly of the vessel (FIG. 4). The upper subassembly 19 consists of the pipe-carrying shell 8 onto which the pipes 10 have been fastened, and onto which the flange 9 has been assembled. The two subassemblies 18 and 19 are then welded to each other. All of these welds are performed by means of automatic submerged arc welding.

The closure head 3 itself is produced by submerged arc welding of the components 3a and 3b.

The various components forming the vessel have thicknesses which are generally between 200 and 300 mm.

In the case of a vessel manufactured according to the process of the invention, the forged components 2a, 2b, 6, 7, 8, 9, 10, 3a and 3b forming the vessel are made of a steel containing chiefly 2 to 2.50% of chromium and 0.9 to 1.10% of molybdenum and whose carbon content does not exceed 0.15%. Preferably, the steel contains 2.25% of chromium and 1% of molybdenum.

More precisely, the steels which may be employed for implementing the process of manufacture according to the invention have a composition such as defined below: C: 0.11 to 0.15%, Mn: 0.30 to 0.60%, Si: 0.15 to 0.35%, Cr: 2 to 2.50%, Mo: 0.9 to 1.1%, Ni: max. 0.30, P: max. 0.005, S: max. 0.005, Cu: max. 0.05, V: max. 0.01, Al: max. 0.02, Co: max. 0.03, Sb: max. 0.001, As: max. 0.012.

The minimum mechanical characteristics obtained for these steels are as follows:

at 20° C.:
Mechanical strength 550 MPa
Elastic limit 385 MPa
Elongation E % 20%
at 330° C.:
Elastic limit 310 MPa.

These steels, which are traditionally employed for the manufacture of components intended for the petrochemical industry, have been found capable of being welded by means of an electron beam in thicknesses of up to at least 300 mm. Welds produced in a single pass with an electron beam welding gun with a power rating of 200 kW have shown excellent metallurgical properties.

The various shells and spherical caps forming the vessel according to the invention have a thickness of between 200 and 300 mm.

The components 2a, 2b, 6, 7, 8, 9, 10 and 3a, 3b are wrought and shaped by means of known foundry and forging processes of the prior art, for the manufacture of the vessel's unit components.

The assembly of these unit components will be carried out as in the technology according to the prior art so as to form the lower subassembly 18 of the vessel by welding the preassembled bottom 2 onto the assembly 13, and the upper subassembly 19 by welding pipes 10 onto the pipe-carrying shell 14, formed by welding the flange 9 onto the shell 8.

The final assembly of the vessel 20 (FIG. 4) is produced by end-to-end welding of the lower subassembly 18 and of the upper subassembly 19.

The various welds are produced in a single pass, by means of an electron beam on the ends, which are placed so that they coincide, of the components to be joined.

Compared with the previous technique of automatic submerged arc welding, the quantities of heat energy which are employed are much smaller and are produced in a reduced volume of material, at the junction of the two components.

The thermal modifications and distortion of the components forming the vessel are consequently reduced. Electron beam welding makes it possible to obtain joints without filler metal, whose radiation resistance is identical with that of the base metal.

Furthermore, the fact that the electron beam welding is carried out in a single pass results in a considerable shortening of the vessel assembly time.

Figure 6:
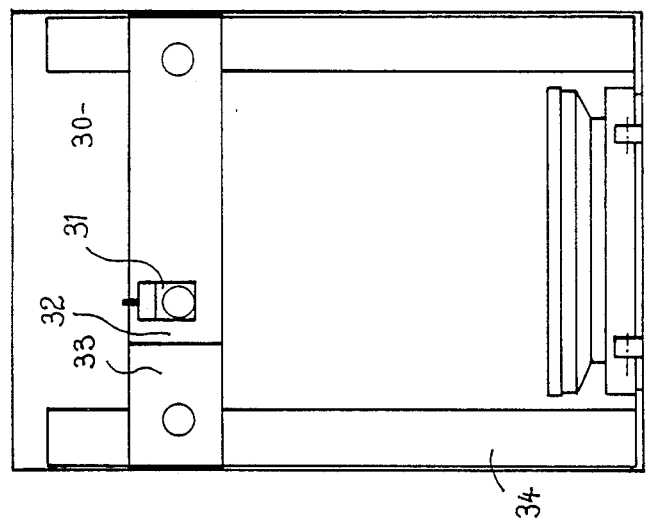
FIGS. 5 and 6 are elevation views, in two perpendicular directions, of a plant for welding a nuclear reactor vessel by means of an electron beam.
Figure 5:
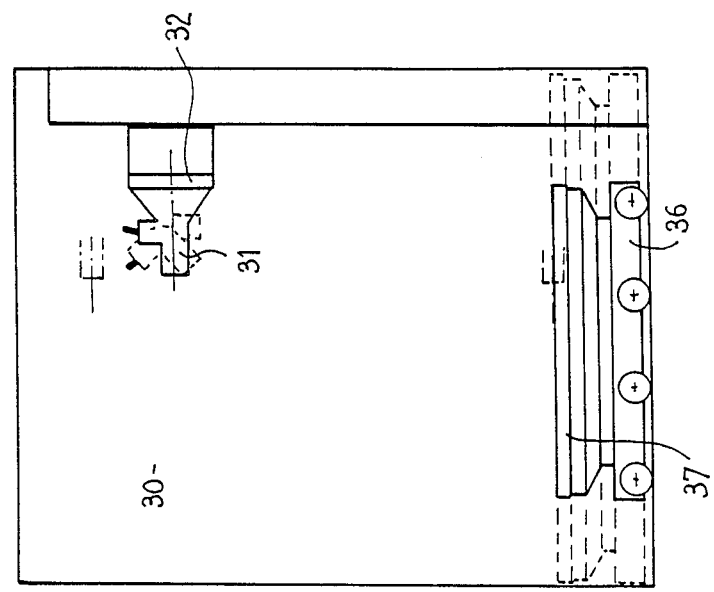
Figure 7:
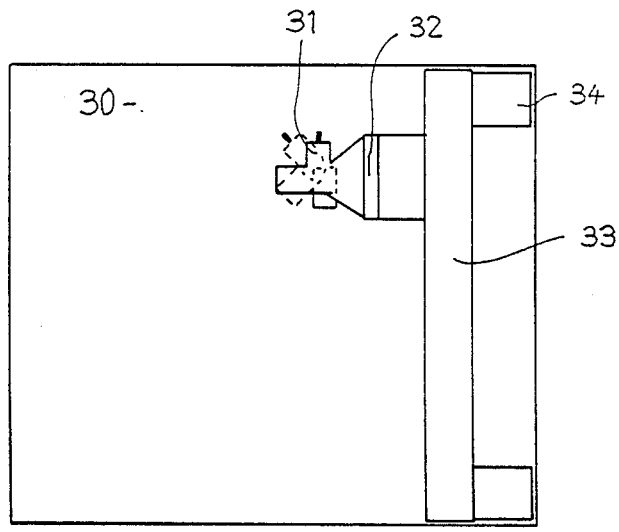
FIG. 7 is a plan view of the plant shown in FIGS. 5 and 6.

FIGS. 5, 6 and 7 show a plant which makes it possible to perform the electron beam welding of the unit components which make up a nuclear reactor vessel.

The plant consists of an enclosure 30 of great size from which the atmosphere can be evacuated by means of a pumping system capable of producing a hard vacuum of the order of $10^{-5}$ mm of mercury.

In the case of the assembly of pressurized-water nuclear reactor vessels whose diameter is in the region of 4.50 m, an enclosure of parallelepipedal shape has been provided, whose internal dimensions are as follows: length: 8.50 m, width: 7.50 m and height: 12.50 m. The volume of such an enclosure is 800 m$^3$. An electron gun 31 with a power rating of 200 kW is fastened onto a carriage 32 mounted so that it can move along the lengthwise direction of a beam 33, itself mounted so that it can move in the vertical direction on two vertical columns 34 extending substantially over the entire height of the enclosure 30. This provides the electron gun with a range of travel of the order of 6 m in the transverse direction and of the order of 9 m in the vertical direction.

As can be seen in FIGS. 5 and 7, the gun 31 is mounted so that it can move in rotation on the carriage 32, over a range of 90°, around an axis which is horizontal and in transverse direction relative to the enclosure and around a vertical axis.

The electron beam welding plant also comprises a carriage 36 on which there is mounted a rotary platform 37 with a diameter of the order of 5 m. The carriage 36 is mounted so that it can move inside the enclosure 30, so as to be capable of travelling over a range of the order of 3.30 m, in the lengthwise direction of the enclosure 30.

A plant such as shown in FIGS. 5, 6 and 7 makes it possible to produce all the welds of a nuclear reactor vessel assembly.

In order to produce the welds for assembling the shells together or the shells and the spherical caps, the components to be assembled are fastened onto the platform 37 and the electron gun 31 is placed in a horizontal position at the desired height in order to produce the welded joint. The components are made to rotate around the vertical axis of the rotary platform 37 and the welded joint is produced by an electron beam in a single pass, at a speed of between 10 and 40 cm/min, depending on the thickness of the joint to be welded.

It has been possible to produce weld joints of a thickness ranging up to 300 mm and of excellent metallurgical quality, on components made of steel containing 2.25% of chromium and 1% of molybdenum.

The pipes 10 may also be fastened by welding by means of an electron beam to the pipe-carrying shell 8 by using the plant in FIGS. 5, 6 and 7. This operation can be performed by a process characterized by a connecting surface between each of the pipes and the shell which is of frusto-conical shape.

The steel employed for producing the components has the essential advantage of relatively low radiation sensitivity. In an unirradiated state, the initial temperature of the ductile plateau of this chromium-molybdenum steel lies below −20° C. This temperature rises to a level in the region of 0° to 10° C. after forty years of irradiation under the operating conditions close to the core of a nuclear reactor. These conditions correspond to the maximum lifetime of a nuclear reactor vessel. Consequently, the components made according to the process of the invention of a chromium-molybdenum steel are not subject to a cleavage failure due to unstable crack propagation, which can appear only below the ductile plateau. Any risk of crack propagation capable of giving rise to a leakage in the vessel is also avoided.

Furthermore, since the carbon content of the steel employed is low, a single layer of stainless coating is generally required on the inner wall of the vessel. This advantage is correspondingly more marked, the lower the limit of the carbon content of the steel.

The invention is not limited to the embodiments which have been described.

The only limitations of the process relate to the wall thickness which can be welded in a single pass by means of an electron beam.

Bearing in mind this limitation, the invention can be applied to the production of any vessel for a nuclear reactor.

I claim:

1. Process for the manufacture of a light-water nuclear reactor vessel comprising a shell having a thickness, greater than 100 mm, symmetrical in revolution, consisting in shaping at least two unit components of overall symmetrical shape in revolution and in assembling said unit components by welding over their entire thickness to produce the nuclear reactor vessel, wherein the unit components (2a, 2b, 6, 7, 8, 9, 10, 3a, 3b) are made of a steel containing 2 to 2.50% of chromium, 0.9 to 1.1% of molybdenum and less than 0.15% of carbon, and the assembly of the unit components is carried out by welding by means of an electron beam, in a single pass, without filler metal, over the entire thickness of the unit components.

2. Process of manufacture according to claim 1, wherein the steel has the following composition:
C: 0.11 to 0.15%, Mn: 0.30 to 0.60%, Si: 0.15 to 0.35%, Cr: 2 to 2.5%, Mo: 0.9 to 1.1%, Ni: max. 0.30%, P: max. 0.005%, S: max 0.005%, Cu: max. 0.05%, V: max. 0.01%, Al: max. 0.02%, Co: max. 0.03%, Sb: max. 0.001%, As: max. 0.012%.

3. Process of manufacture according to claim 1, wherein the unit components (2b, 6, 7, 8) have a wall thickness of between 200 and 300 mm.

4. Process of manufacture according to claim 1, in the case where the component is a pressurized-water nuclear reactor vessel comprising a hemispherical bottom (2), a core shell (13) and a pipe-carrying shell (8), wherein the hemispherical bottom (2) is connected to the core shell (13) be welding by means of an electron beam, thus producing a lower subassembly of the vessel (18) connected to an upper subassembly (19) consisting of the pipe-carrying shell (14) fixed integrally to a flange (9) for supporting a vessel closure head (3), also by welding by means of an electron beam.

5. Pressurized-water nuclear reactor vessel comprising a cylindrical body closed by dished bottoms of hemispherical shape, wherein said nuclear reactor vessel consists of unit components whose wall thickness is greater than 100 mm, made of steel containing substantially from 2 to 2.5% of chromium, 0.9 to 1.1% of molybdenum and less than 0.15% of carbon, and said unit components are symmetrical in revolution and are assembled by welding by means of an electron beam in a single pass over their entire wall thickness.

6. Vessel according to claim 5, consisting of a hemispherical bottom (2) a cylindrical shell (13) and a pipe-carrying shell (14) connected together end to end by welding by means of an electron beam in order to form the vessel body, said vessel comprising a hemispherical closure head (3).

* * * * *